United States Patent
Lim

(10) Patent No.: US 7,684,766 B2
(45) Date of Patent: Mar. 23, 2010

(54) SYSTEM AND METHOD FOR MANAGING TALK BURST AUTHORITY OF A MOBILE COMMUNICATION TERMINAL

(75) Inventor: Guk-Chan Lim, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 1278 days.

(21) Appl. No.: 11/188,032

(22) Filed: Jul. 22, 2005

(65) Prior Publication Data

US 2006/0019613 A1    Jan. 26, 2006

(30) Foreign Application Priority Data

Jul. 23, 2004    (KR) ...................... 10-2004-0057716

(51) Int. Cl.
*H04B 1/46*    (2006.01)
*H04B 1/38*    (2006.01)

(52) U.S. Cl. .................... 455/79; 455/563; 455/90.2

(58) Field of Classification Search ................. 455/79, 455/563, 90.1, 90.2, 116, 73
See application file for complete search history.

(56) References Cited

U.S. PATENT DOCUMENTS

| | | |
|---|---|---|
| 5,371,901 A | 12/1994 | Reed |
| 5,649,307 A | 7/1997 | Patino et al. |
| 5,722,086 A | 2/1998 | Teitler et al. |
| 6,446,042 B1 * | 9/2002 | Detlef et al. ................. 704/275 |
| 6,522,894 B1 | 2/2003 | Schmidt |
| 6,970,909 B2 * | 11/2005 | Schulzrinne ................. 709/206 |
| 2004/0054539 A1 | 3/2004 | Simpson |

FOREIGN PATENT DOCUMENTS

| | | |
|---|---|---|
| EP | 1241861 | 9/2002 |
| GB | 2322044 | 8/1998 |
| JP | 60-083431 | 5/1985 |
| JP | 07-005895 | 1/1995 |
| JP | 2000-059496 | 2/2000 |
| JP | 2002-135854 | 5/2002 |
| JP | 2003-152860 | 5/2003 |
| KR | 1020010054608 | 7/2001 |
| WO | WO 94/26054 | 11/1994 |
| WO | 01/37526 | 5/2001 |

* cited by examiner

*Primary Examiner*—Eugene Yun
(74) *Attorney, Agent, or Firm*—Lee, Hong, Degerman, Kang & Waimey

(57) ABSTRACT

A method for managing talk burst authority of a mobile communication terminal for a PTT service comprises detecting a trigger signal generated from a voice activity detector in response to an audio input; activating a voice recognition processor to process the audio input; deactivating the corresponding voice recognition processor after a predetermined time has lapsed; transmitting a talk burst request message to the PTT server, when the audio input is for requesting permission to speak; transmitting the audio input to the PTT server; and storing the audio input in a buffer.

15 Claims, 3 Drawing Sheets

SYSTEM AND METHOD FOR MANAGING TALK BURST AUTHORITY OF A MOBILE COMMUNICATION TERMINAL

CROSS REFERENCE TO RELATED APPLICATIONS

Pursuant to 35 U.S.C. §119(a), this application claims the benefit of earlier filing date and right of priority to Korean Patent Application No. 2004-57716, filed on Jul. 23, 2004, the content of which is hereby incorporated by reference herein in its entirety.

FIELD OF THE INVENTION

The present invention relates to a mobile communications terminal, and particularly, to A system and method for managing talk burst authority using voice (or audio) detection and recognition in a mobile communications terminal for a Push-To-Talk (PTT) service.

BACKGROUND OF THE INVENTION

A Push-To-Talk (PTT) service is a service using a half-duplex mode over a radio frequency based communication network (e.g., a cellular communication network) in which only one user is allowed to speak at a time. That is, each user will have to take turn and wait for any ongoing conversation by other parties to the communication to be completed before the user can speak.

The PTT service provides one-to-one or one-to-group conversations according to a user selection. According to one implementation, each user will have to receive talk burst authority before attempting to send voice communication in the half-duplex mode.

The one-to-group conversation utilizes the PTT service for a plurality of parties. When a certain user presses a PTT key by selecting a plurality of users or groups, a session is established between PTT terminals through a PTT server. Thus, all of the selected recipients take part in the session, thereby transmitting and receiving voice (or audio) data.

A mobile communication terminal (hereinafter a PTT terminal) for all the PTT services having the established session can provide PTT communications. However, the PTT terminal must receive talk burst authority to transmit the voice data. The PTT server manages the talk burst authority so as to allow only one user to transmit the voice data.

In the related art, a user must perform a series of operations for pressing or releasing a PTT key on the PTT terminal to request talk burst authority or release talk burst authority. As a result, when the user is in a condition that he can not use his hands or must press and release the PTT key several times, the user is inconvenienced.

Voice recognition may be used instead of pressing the PTT key. That is, a user can speak a designated term (e.g., voice signal) to request and release talk burst authority. The PTT terminal recognizes the inputted voice and confirms whether the corresponding voice is a voice for requesting talk burst authority or releasing it. According to the result of the voice recognition, the PTT terminal transmits a talk burst request message or a talk burst release message to the PTT server.

In case that the talk burst authority is managed using voice recognition, the PTT terminal requires additional resources in order to recognize the voice inputted by the user. For example, the PTT terminal will have to use additional battery power to continuously monitor whether a voice signal is inputted by the user. Furthermore, the PTT terminal requires various software resources and hardware processors for voice recognition to accurately recognize the voice signals inputted.

As a result, additional resources need to be provided to a PTT terminal. Further, there is a high possibility that the battery power of the PTT terminal is rapidly diminished. As such, there is a need for a more efficient system of requesting and releasing talk burst authority.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a system for managing talk burst authority in a mobile communication terminal for a Push-To-Talk (PTT) service is provided. The system comprises a voice activity detector for generating a trigger signal, in response to audio input to a microphone of the mobile communication terminal; and a processing unit for detecting the trigger signal, controlling an operation of a voice recognition processor according to the trigger signal, and sending talk burst authority messages according to voice recognition results provided by the voice recognition processor.

In one embodiment, the system further comprises a buffer for temporarily storing audio input provided by a user of the mobile communication terminal. The voice activity detector generates a trigger signal from a first logic level (e.g., 'low') to a second logic level (e.g., 'high') when audio input is detected. And, the voice activity detector generates a trigger signal from 'high' to 'low' when audio input is not detected after a threshold period has passed.

In one embodiment, the processing unit transmits a talk burst request message to a PTT server, when the voice recognition processor recognizes the audio input as a voice signal for requesting a talk burst authority. The processing unit transmits a talk burst release message to the PTT server, when the voice recognition processor recognizes the audio input as a voice signal for a releasing the talk burst authority.

In a preferred embodiment, the buffer is managed by a First-In-First-Out (FIFO) method. The audio input is stored in the buffer until the voice activity detector generates a trigger signal from 'high' to 'low'. In another embodiment, the stored audio input in the buffer is processed by the voice recognition processor, when the trigger signal is generated from 'high' to 'low'.

In accordance with yet another aspect of the invention, a method for managing talk burst authority of a mobile communication terminal for a PTT service is provided. The method comprises detecting, by a processing unit, a trigger signal generated in response to an audio signal inputted through a microphone of the mobile communication terminal; activating a voice recognition processor to process the audio signal in response to the generation of the trigger signal; and transmitting to a PTT server a talk burst authority message, when the audio signal is recognized as a valid voice signal.

The voice recognition processor is activated to recognize the audio signal for a first period of time after the trigger signal is generated. And, the voice recognition processor is deactivated after the first period of time has lapsed. In certain embodiments, the transmitting to PTT server comprises transmitting a talk burst request message to the PTT server by the processing unit, when the audio signal is recognized as a first voice signal.

The first voice signal may be a request for talk burst authority. The second voice signal may be a release of talk burst authority. In one embodiment, the transmitting to PTT server comprises transmitting a talk burst release message to the PTT server by the processing unit, when the audio signal is recognized as a second voice signal.

In accordance with yet another aspect of the invention a method for managing talk burst authority of a mobile communication terminal for a PTT service comprises generating a trigger signal by a voice activity detector, in response to an audio input, activating a voice recognition processor for a first period; processing the audio input in said first period to determine whether it is a valid voice signal for sending a burst authority message to a PTT server; transmitting a request for talk burst authority, when the audio input is recognized as a first command.

The method may further comprise transmitting a release for talk burst authority, when the audio input is recognized as a second command. Preferably, the first period corresponds with time needed for a speaker to verbally provide the audio input. The audio input is compared with a prerecorded audio signal for recognition purposes, in one embodiment.

In another embodiment, a method for managing talk burst authority of a mobile communication terminal for a PTT service comprises detecting a trigger signal generated from a voice activity detector in response to an audio input; activating a voice recognition processor to process the audio input; deactivating the corresponding voice recognition processor after a predetermined time has lapsed; transmitting a talk burst request message to a PTT server, when the audio input is for requesting permission to speak; transmitting the audio input to the PTT server; and storing the audio input in a buffer.

The method may further comprise transmitting a talk burst request message to the PTT server, when the audio input is recognized as a command for a talk burst authority request and transmitting a talk burst release message to the PTT server, when the audio input is recognized as a command for a talk burst authority release.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

Features, elements, and aspects of the invention that are referenced by the same numerals in different figures represent the same, equivalent, or similar features, elements, or aspects in accordance with one or more embodiments of the system.

DETAILED DESCRIPTION OF THE PREFERRED EMBODIMENT

A preferred embodiment of the present invention comprises a voice activity detector for generating a trigger signal in a PTT terminal when a user inputs a voice signal through a microphone of the PTT terminal. In other words, when the user inputs a specific voice signal, the voice activity detector generates a trigger signal, and a processing unit of the PTT terminal performs a series of operations for recognizing the inputted voice.

Figure 1:
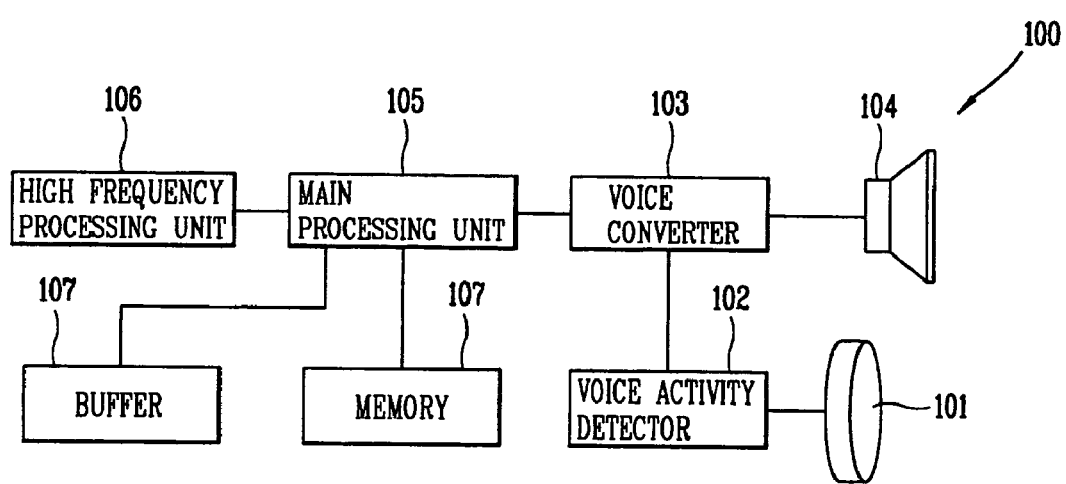
FIG. 1 is a block diagram of a PTT terminal according to one embodiment of the present invention.

FIG. 1 is a block diagram showing an exemplary embodiment of the PTT terminal according to the present invention. The exemplary PTT terminal comprises a voice activity detector 102 for generating a trigger signal when a voice is inputted through a microphone 101 of the PTT terminal; a voice converter 103 for coding the voice inputted through the microphone 101 (or decoding a received voice signal to thereafter output the voice through a speaker 104).

In one embodiment, a high frequency processing unit 106 is also included for transmitting and receiving high frequency audio signals. A processing unit 105 for handling conversations and voice recognition via the high frequency processing unit 106 and a memory 107 for storing various programs and data for driving the processing unit 105 may be also included.

The PTT terminal may further comprise a buffer 108 for temporarily storing the user voice inputted through the microphone 101. The buffer may be an independent module or alternatively included in the processing unit 105 and operate using a First-In-First-Out (FIFO) method in which a previously inputted voice signal is outputted in advance of a newly inputted voice signal, for example.

Figure 2A:
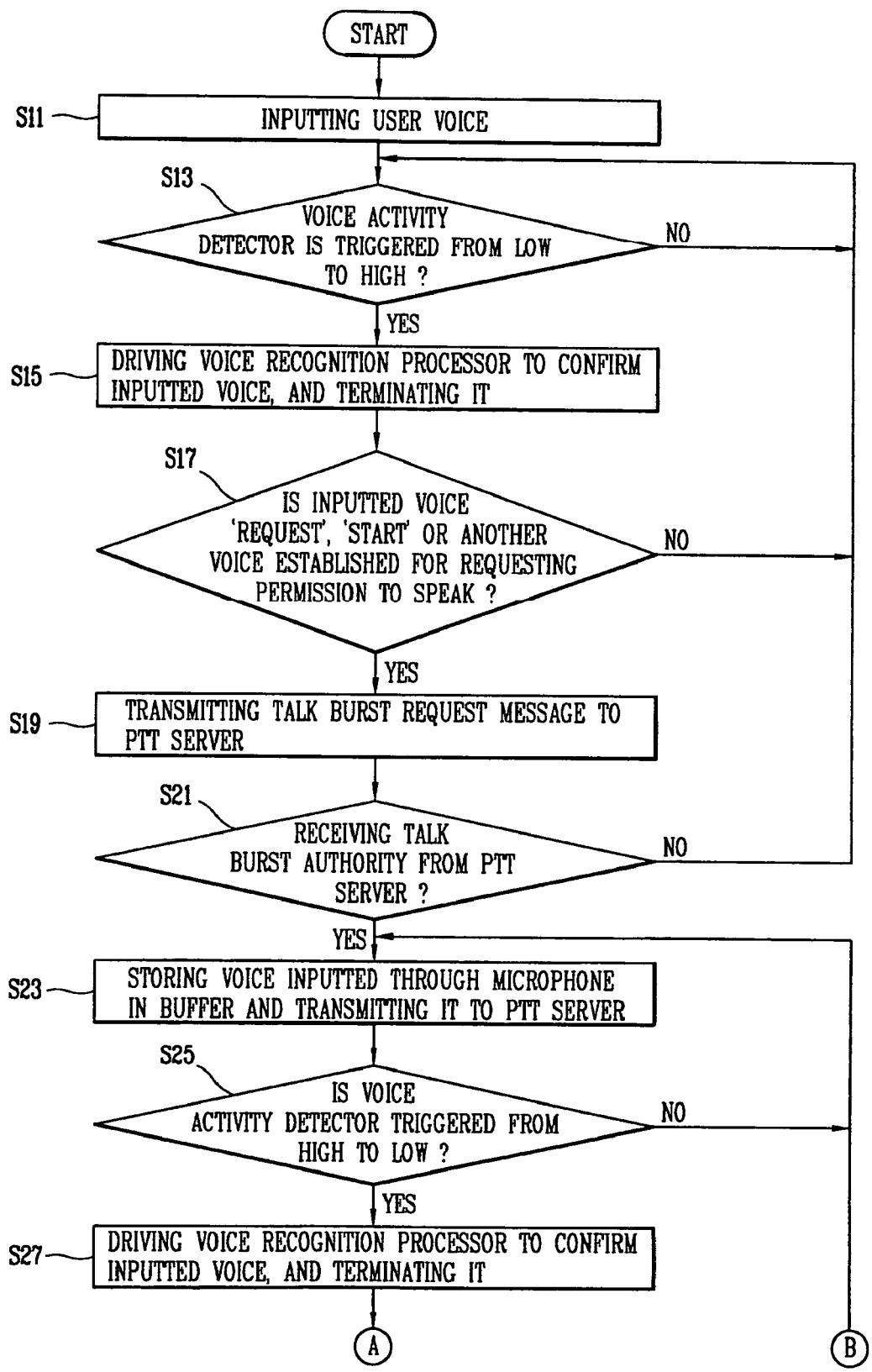
FIGS. 2A and 2B are flow charts of a preferred method for managing talk burst authority according to one embodiment of the present invention.
Figure 2B:
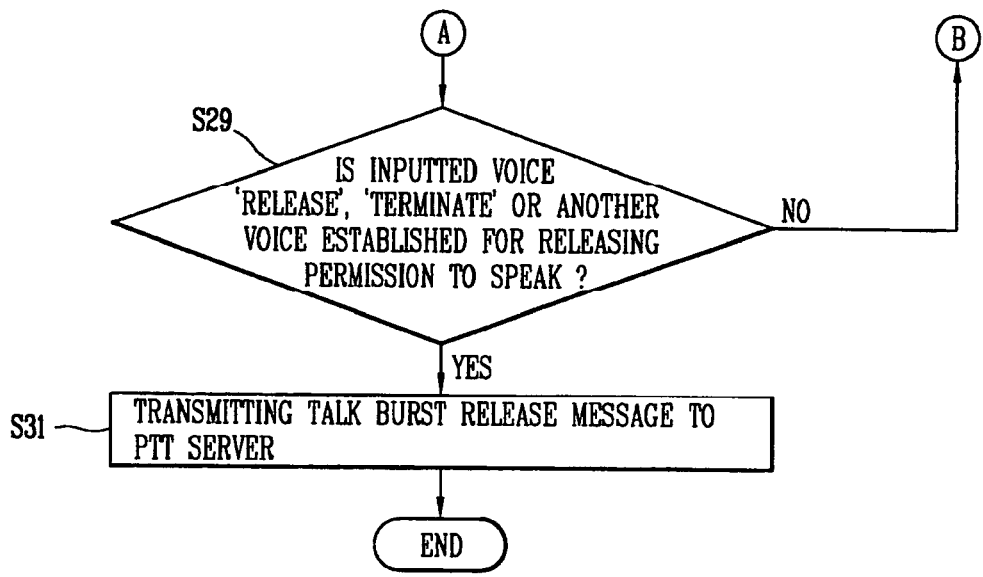

FIGS. 2A and 2B are flow charts illustrating a method for managing a talk burst authority according to the present invention, in which the PTT terminal recognizes the user voice and thus requests or releases the talk burst authority.

In order to request or release talk burst authority using voice recognition, a voice signal i.e. a particular word or sentence used for requesting the talk burst authority or a particular word or sentence used for releasing the talk burst authority is programmed in the PTT terminal. For instance, the voice signal for requesting permission may be 'request' or 'start', and the voice signal for releasing permission may be 'release' or 'terminate'.

As shown in FIG. 2A, when a user inputs his voice through the microphone 101 of the PTT terminal (S11), the voice activity detector 102 in the PTT terminal generates a trigger signal. When the user inputs a voice command or voice signal into the PTT terminal, the voice activity detector 102 is triggered from, for example, a first logic level (e.g., 'low') to a second logic level (e.g., 'high').

When the voice activity detector 102 generates a signal from 'low' to 'high' (S13), the processing unit 105 activates the voice recognition processor to process the user's voice and thereafter deactivates voice recognition processor (S15). In one embodiment, the voice recognition processor is active for the length of time that the user takes to speak (i.e., pronounce) a voice command and is then deactivated.

If the voice processed by the voice recognition processor corresponds to 'request' or 'start', for example, or another voice signal previously programmed for requesting permission to speak (S17), the processing unit 105 transmits a talk burst request message to a PTT server (not shown) (S19). If the voice processed by the voice recognition processor does not correspond to a preprogrammed voice signal for requesting permission to speak, the processing unit 105 does not transmit the talk burst request message.

If the PTT terminal 100 receives talk burst authority from the PTT server (S21), the user voice inputted through the microphone 101 is transmitted to the PTT server through the processing unit and simultaneously stored in the buffer 108 (S23). The buffer 108 in one embodiment is driven by a FIFO method. Thus, the last inputted voice is stored in the buffer 108. The buffer size is sufficient for storing multiple voice signals.

After the PTT terminal receives talk burst authority, if the user voice is inputted through the microphone 101, the voice activity detector 102 generates a signal which is triggered from 'low' to 'high', and the processing unit 105 activates the voice recognition processor to process the inputted voice.

If the inputted voice is not recognized as a voice signal, however, the voice recognition processor remains active for a predetermined time, but the talk burst request message or talk burst release message is not transmitted to the PTT server. In one embodiment, the processing unit 105 of the PTT terminal transmits the user's voice to the PTT server and stores the user's voice in the buffer.

If the user does not input any voice for a predetermined time, the voice activity detector 102 generates a signal which is triggered from 'high' to 'low' (S25). The processing unit 105 activates the voice recognition processor to process the latest voice stored in the buffer, and thereafter deactivates the voice recognition processor (S27).

In a preferred embodiment, the processing unit 105 determines the generation of the trigger signal and activates the voice recognition processor to process the a voice stored in the buffer, thereafter terminating the voice recognition detector. The voice recognition processor is activated for a length of time that the user takes to speak (or pronounce) 'release', 'terminate' or another voice signal for releasing the talk burst authority.

Referring to FIG. 2B, when the voice processed by the voice recognition processor is 'release', 'terminate' or another voice signal for releasing the talk burst authority (S29), the processing unit 105 transmits the talk burst release message to the PTT server (S31). Otherwise, the processing unit 105 determines that the user has stopped a voice input, and thus does not transmit the talk burst release message. The processing unit 105 continuously processes voice input by a user to determine a voice signal is inputted.

In one embodiment, in the process for requesting permission to speak, if the voice activity detector is triggered from 'low' to 'high', the voice recognition processor is activated. The voice inputted through the microphone is processed to recognize a voice signal by the user requesting permission to speak. If a voice signal is recognized, the processing unit of the PTT terminal transmits the talk burst request message to the PTT server.

In another embodiment, in the process for transmitting the user's voice to the PTT server by the PTT terminal which has received permission to speak, the user voice inputted through the microphone is transmitted to the PTT server and simultaneously stored in the buffer of the PTT terminal. The buffer is large enough to store voice signals, so that the voice recognition processor can process the commands. The buffer also stores the latest inputted voice.

In yet another embodiment, in the process for releasing permission to speak, if the user inputs a voice signal established for releasing the talk burst authority and does not input any other voice for a predetermined time, the voice activity detector is triggered from the second logic level to the first logic level (e.g., 'high' to 'low') and the voice recognition processor is activated. The voice recognition processor confirms the latest voice stored in the buffer. When the voice stored in the buffer corresponds to the voice established for releasing the talk burst authority, the processing unit of the PTT terminal transmits the talk burst release message to the PTT server.

In a preferred embodiment, the voice recognition processor initiates its operation at a time that the voice activity detector is triggered from 'low' to 'high' or from 'high' to 'low', and is activated long enough to recognize the voice signal for requesting or releasing the talk burst.

Accordingly, when requesting or releasing permission to speak using voice recognition, consumption of power and unnecessary hardware resources for continuous speech recognition is minimized by defining time points for starting and terminating the operation of the voice recognition processor.

The embodiments described above are to be considered in all aspects as illustrative only and not restrictive in any manner. Thus, other exemplary embodiments, system architectures, platforms, and implementations that can support various aspects of the invention may be utilized without departing from the essential characteristics described herein. These and various other adaptations and combinations of features of the embodiments disclosed are within the scope of the invention. The invention is defined by the claims and their full scope of equivalents.

What is claimed is:

1. A system for managing talk burst authority in a mobile communication terminal for a Push-To-Talk (PIT) service, the system comprising:
    a voice activity detector for generating a trigger signal when a voice is input via a microphone of the mobile communication terminal;
    a voice recognition processor for performing a voice recognition operation to recognize the voice input to determine if the voice input corresponds to a voice command for requesting a talk burst authority or releasing the talk burst authority;
    a buffer for temporarily storing the voice input; and
    a processing unit for detecting the trigger signal, initiating operation of the voice recognition processor when the trigger signal is detected, terminating the operation of the voice recognition processor after a predetermined time period according to the detected trigger signal, and controlling management of the talk burst authority by transmitting a talk burst request message or a talk burst release message to a PIT sewer according to a result of the voice recognition operation.

2. The system of claim 1, wherein the voice activity detector changes the trigger signal changes from a first logic level to a second logic level, when the voice input is detected.

3. The system of claim 1, wherein the voice activity detector changes the trigger signal changes from a second logic level to a first logic level, when the voice input is not detected after predetermined time period.

4. The system of claim 1, wherein the buffer is managed by a First-In-First-Out (FIFO) method.

5. The system of claim 4, wherein the voice input is stored in the buffer until the trigger signal changes from a second logic level to a first logic level.

6. The system of claim 5, wherein the voice input stored in the buffer is processed by the voice recognition processor when the trigger signal changes from the second logic level to the first logic level.

7. The system of claim 1, wherein the processing unit activates the voice recognition processor for a first period of time after the trigger signal is detected.

8. The system of claim 1, wherein the voice recognition processor recognizes the voice stored in the buffer if the microphone has not received a voice input for a predetermined time and the trigger signal is deactivated.

9. A method for managing talk burst authority of a mobile communication terminal for a PTT service, the method comprising:
    generating a trigger signal in a voice activity detector when a voice is input via a microphone;

performing a voice recognition operation on the voice input in a voice recognition processor to determine if the voice input corresponds to a voice command for requesting a talk burst authority or releasing the talk burst authority;

storing the voice input in a buffer;

detecting the trigger signal generated by the voice activity detector in a processing unit;

controlling the voice recognition processor via a main processing unit, such that the voice recognition operation is initiated when the trigger signal is detected and the voice recognition operation is terminated after a predetermined time period according to the detected trigger signal; and transmitting a talk burst request message or a talk burst release message to a PTT server according to a result of the voice recognition operation.

10. The method of claim 9, wherein the voice recognition processor is activated to recognize the voice input for a first period of time after the trigger signal is generated.

11. The method of claim 10, wherein the voice recognition processor is deactivated after the first period of time has lapsed.

12. The method of claim 9, wherein the transmitting the talk burst request message or a talk burst release message to PTT sewer comprises:

transmitting the talk burst request message to the PTT server when the voice input is recognized as a first voice signal.

13. The method of claim 12, wherein the first voice signal is a request for talk burst authority.

14. The method of claim 9, wherein the transmitting the talk burst request message or a talk burst release message to the PTT server comprises:

transmitting the talk burst release message to the PTT server when the voice input is recognized as a second voice signal.

15. The method of claim 14, wherein the second voice signal is a release of talk burst authority.

* * * * *